(12) United States Patent
Colla et al.

(10) Patent No.: US 6,272,239 B1
(45) Date of Patent: Aug. 7, 2001

(54) DIGITAL IMAGE COLOR CORRECTION DEVICE AND METHOD EMPLOYING FUZZY LOGIC

(75) Inventors: Federica Colla, Crema; Massimo Mancuso, Monza; Rinaldo Poluzzi, Milan, all of (IT)

(73) Assignee: STMicroelectronics S.r.l. (IT)

( * ) Notice: Subject to any disclaimer, the term of this patent is extended or adjusted under 35 U.S.C. 154(b) by 0 days.

(21) Appl. No.: 09/222,247

(22) Filed: Dec. 28, 1998

(30) Foreign Application Priority Data

Dec. 30, 1997 (EP) .................................................. 97830730

(51) Int. Cl.$^7$ ........................................................ G06K 9/00

(52) U.S. Cl. .......................................... 382/167; 362/171

(58) Field of Search ..................................... 382/162, 163, 382/164, 165, 166, 167, 168, 169, 170, 171, 172, 232, 233, 234

(56) References Cited

U.S. PATENT DOCUMENTS

| | | | |
|---|---|---|---|
| 5,339,365 | * 8/1994 | Kawai et al. | 382/54 |
| 5,384,601 | * 1/1995 | Yamashita et al. | 348/577 |
| 6,088,475 | * 7/2000 | Nagashima et al. | 382/162 |

FOREIGN PATENT DOCUMENTS 04167866   6/1992  (EP) .

OTHER PUBLICATIONS

EPO, European Search Report, EP 97830730, May 19, 1998.
Journal of Imaging Technology, "Facial Pattern Detection and Color Correction from Television Picture for Newspaper Printing", Y. Miyake et al., Oct., 1990, vol. 16, No. 5, pp. 169–169.

Fuzzy Engineering Toward Human Friendly Systems, "Image Processing Using Fuzzy Logic For A Video Print System", Nov. 13, 1991, Amsterdam NL, pp. 1003–1012, XP002065310.

* cited by examiner

Primary Examiner—Phuoc Tran
Assistant Examiner—Amir Alavi
(74) Attorney, Agent, or Firm—Jenkens & Gilchrist, A Professional Corporation

(57) ABSTRACT

A digital image color correction device and method employing fuzzy logic, for correcting a facial tone image portion of a digital video image is provided. The device is a pixel fuzzifier unit (1) receiving in input a stream of pixels belonging to a sequence of correlated frames of a digital video image and computing a multilevel value representing a membership of each pixel to a skin color class; a global parameter estimator (2) receiving in input each of said pixel and the relative membership value, and computing a first and a second parameter which define the characteristics of a portion of said image that belongs to said skin color class; a processing unit (3) connected downstream to said global parameter estimator and to said pixel fuzzifier unit and adapted to correct each of the pixels of said portion of the image that belongs to said skin color class, according to said first global parameter (300), to obtain corrected pixels; and a processing switch (4) for outputting said pixels or said corrected pixels according to said second global parameter (400).

29 Claims, 4 Drawing Sheets

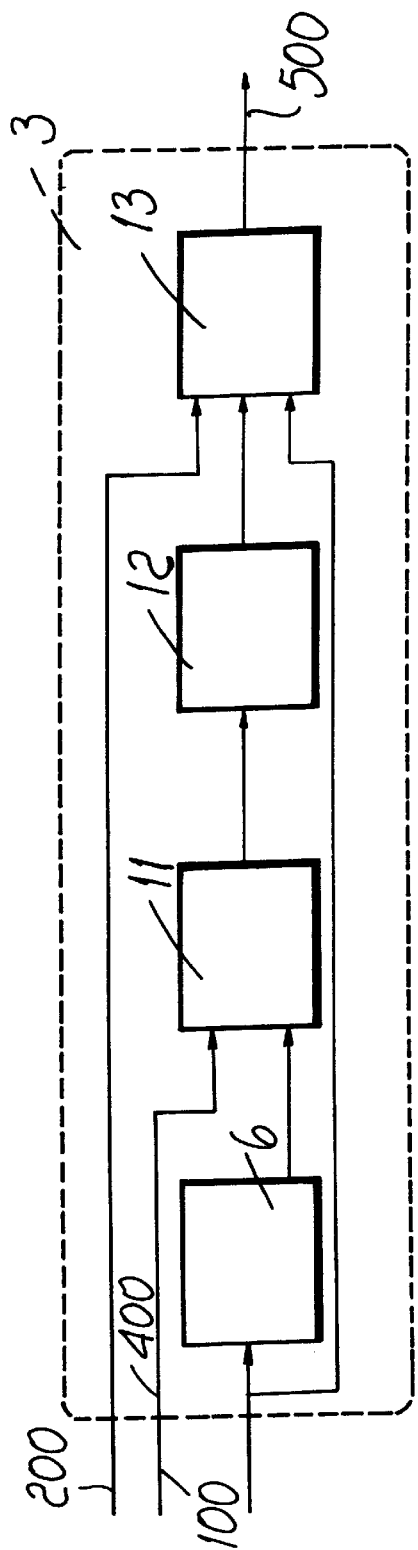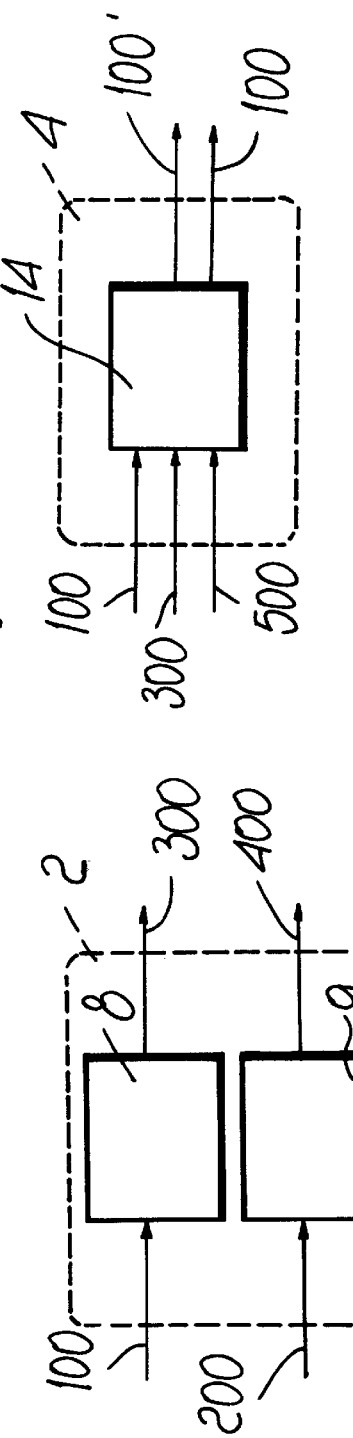
Fig. 8
Fig. 7
Fig. 9

DIGITAL IMAGE COLOR CORRECTION DEVICE AND METHOD EMPLOYING FUZZY LOGIC

FIELD OF THE INVENTION

The present invention relates to a digital image color correction device employing fuzzy logic. More particularly, the invention relates to a device for color class correction and in particular for the correction of the skin color class of a digital image.

BACKGROUND OF THE INVENTION

Many color models have been proposed to formalize color description. In most of these color models, a color is represented as a point in a three-dimensional discrete space. These spaces are very useful for a mathematical manipulation of color, but they are very far from how human beings usually describe this feature.

In fact, in everyday life, when describing an object by its color, people use labels like "green" or "blue", enriched with qualifiers like "deep" or "dark." It can be noticed that a linguistic description is somewhat vague and imprecise. A label identifies a set in a color space. In fact, an object that is given a single label is really made up of many different shades.

What appears to be a lack of precision is a form of approximation that allows persons to deal in a simple and easy way with a big amount of information. Moreover, it would be inconceivable to describe an object by specifying color coordinates for each point in a discrete space, and doing this, would not add any useful information for people.

As said before, a linguistic label in a color space identifies a set inside it; but trying to give a precise definition of this set, is not so simple, because colors gradually tone down in one another, and for some of them it is possible to combine a label only arbitrarily. This shows the real nature of colors expressed in a linguistic form. Colors and fuzzy sets whose membership functions can be defined on any color space. For such a fuzzy set the term "color class" will be used.

Since most color spaces are three-dimensional, the membership functions we are going to define are surfaces in quadrimensional space. There are two main problems in defining these functions. First, since membership functions must be defined on a basis of human perception of colors, for each color class and for each point in the color space the membership value should be chosen by human observers.

Unfortunately color spaces have millions of points and so the second problem is the resulting amount of data, that requires a table with millions of entries for a single class description.

The approach that is used is based on linguistic rules to define a color lass. Rules will refer to a color space distinguishing hue, saturation and lightness. Among these spaces we choose HSV. A description of RGB and HSV color spaces follows.

In the RGB color space a color is represented by the three primary component red, green and blue. This space is shaped as a cube, whose vertices coincide with the pure colors red, green, blue, cyan, magenta, yellow, black and white (see FIG. 1).

The gray scale lays on the diagonal, which joins together the origin (black) and the opposite vertex (white). Monitors, televisions and some other similar visualization devices make use of this color space for visualizing images.

This kind of color representation is different from the way we perceive a color. We generally identify a hue, an intensity and a saturation. The HSV color space represents a color with hue, saturation and value (intensity). The HSV color space has been chosen for the identification of colors. This space can be represented as an upturned cone (see FIG. 2), where the value varies moving on the axis, the saturation varies moving on the radius of the circle and the hue varies with the angle of the circle.

The detection of the skin color class is performed by means of fuzzy sets, defined on H, S and V. In this space a class can be characterized by assertions on the components. For example for a point p and for the blue color class we can say:

IF $h_p$ is $blue_h$, AND $s_p$ is $high_s$ AND $v_p$ is $high_v$ THEN $p$ is blue where $h_p$, $s_p$ and $v_p$ are the hue, saturation and value of p. While the consequent part of the rule refers to the color class "blue", the antecedent one contains the fuzzy sets $blue_h$, $high_s$ and $high_v$, whose membership functions are defined respectively on H, S and V. Note that $high_s$ and $high_v$ are different fuzzy sets. In fact, the membership functions have different domains, even if they may have the same form.

Once the fuzzy sets in their antecedent part have been defined, they can be used to compute the membership value of p to the class. If $u_h$, $u_s$ and $u_v$ are the membership function on H, S and V for a given color class, the membership value of a point p with coordinates ($h_p$, $s_p$, $v_p$) to such class is computed as:

$$u_p = T(u_h(h_p), u_s(s_p), u_v(v_p))$$

where T is the T-norm operator, which implements the "and" logical connector in the sentence.

Membership functions for the fuzzy sets of the antecedent can be experimentally obtained, by observing color variations when changing h, s or v with the aid of some graphical tools. It is also necessary to choose a T-norm operator and the "and" connector in the rules.

It may be observed that the rule-based approach does not give the same freedom in defining color classes, since in general it is not possible to associate arbitrary values to different points of the HSV space. This is true, but on the other hand the ability to have a punctual resolution in membership function definition may not be so useful. Choosing a membership value different from 0 or 1 for an (h, s, v) triplet would be an arbitrary matter, while it is important to hold the intuitive and visual shading of colors. In this approach, with an eight bit component quantization, only three 256 table entries are needed to define the class completely.

Classical image processing operators are usually applied to the full image or to a previously selected part of it. In the latter case the selection is usually done by hand or through selection tools based on some characteristics of the pixel.

Suppose we want to apply some operators to a particular color class in the image. The use of operators that modify hue, saturation or value of selected pixel would allow different color corrections to be applied on different color classes. The region where the operator should work, could be identified by an a-cut extracted from a fuzzy set previously found.

A problem arises when determining the best alfa-level for the cut. The use of a crisp set would produce undesirable and noticeable effects on the borders of the selected region.

A solution to this problem can be found in using soft operators. This kind of operators allows the application to a region identified by a fuzzy set instead of a crisp set. The definition of such an operator 0' in terms of a traditional one 0 follows:

$$O'(p) == (p)*a_p + p*(1-a_p)$$

where p is the pixel and ap is its membership value to a color class.

If a=0 the pixel is unmodified, while for a=1 the traditional operator 0 is applied. In any other case 0' will be weighted average between p and 0(p). The average is computed on the color space, separately on each component.

Unfortunately the result of the interpolation depends on the color space, because of the non-linearity of the transformation from a color space to another one. In this particular case the HSV color space is not well suited to this operation, because colors on the path from p to 0(p) are not those expected.

Very good results would be obtained by moving to CIEluv or CIElab color spaces before computing the average. Unfortunately the transformations from HSV to these color spaces are quite complex. Quite good results can be obtained also in the RGB color space, with the advantage of a simpler transformation from HSV.

SUMMARY OF THE INVENTION

The aim of the present invention is to provide a digital image color correction device which allows to reproduce the skin color in a facial tone image as close as possible to the reality.

Within this aim, an object of the present invention is to provide a digital image color correction device which is capable of identifying facial tone image of a digital image, particularly of TV images and, if necessary, determine the proper corrections.

Another object of the present invention is to provide a digital image color correction device which could operate only on the facial tone portion of the digital image.

Another object of the present invention is to provide a digital image color correction device which can recognize the skin color class in a digital image and, on the basis of saturation and value characteristics detected inside the recognized class, apply the suitable corrections.

This aim, these objects and others are achieved by a digital image color correction device employing fuzzy logic, for correcting a facial tone image portion of a digital video image comprising:

- a pixel fuzzifier unit receiving in input a stream of pixels belonging to a sequence of correlated frames of digital video image and computing a multilevel value representing a membership of each pixel to a skin color class;
- a global parameter estimator receiving in input each of said pixel and the relative membership value, and computing a first and second parameter which define the characteristics of a portion of said image that belongs to said skin color class;
- a processing unit connected downstream to said global parameter estimator and to said pixel fuzzifier unit and adapted to correct each of the pixels of said portion of the image that belongs to said skin color class, according to said first global parameter, to obtain corrected pixels; and
- a processing switch for outputting said pixels or said corrected pixels according to said second global parameter.

The above aim and objects are also achieved by a method for color correcting, by means of fuzzy logic, a facial tone image portion of a digital video image composed by a sequence of correlated frames, comprising the steps of:

- defining three fuzzy sets to be used to identify a skin color class of a facial tone image portion of a digital video signal;
- examining the image to determine if it is a facial tone image;
- in case of positive response, carrying out a color correction of the pixels of the facial tone image portion; and
- outputting a corrected facial tone image portion.

Further characteristics and advantages of the present invention will become apparent from the description of a preferred embodiment of a digital image color correction device, illustrated only by way of non-limitative example in the accompanying drawings:

BRIEF DESCRIPTION OF THE DRAWINGS

FIG. 7 is a diagram showing the construction of the global parameter estimator of the image processing device shown in FIG. 5.

FIG. 8 is a diagram showing the construction of the processing unit of the image processing device shown in FIG. 5.

FIG. 9 is a diagram showing the construction of the processing switch unit of the image processing device shown in FIG. 5.

DETAILED DESCRIPTION OF THE PREFERRED EMBODIMENT

The algorithm we are going to present makes use of the above exposed methodology. The invention has been implemented to be able to recognize inside an image the skin color class and to apply automatically some corrections only to this class.

Figure 1:
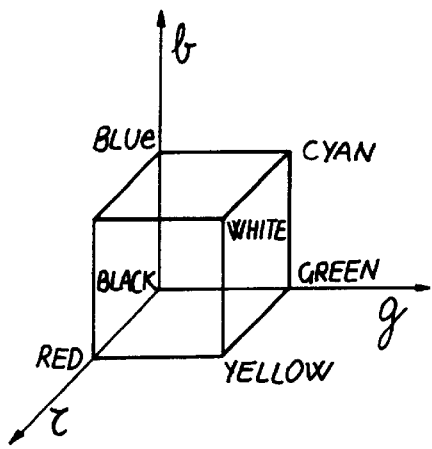
FIG. 1 shows the RGB color space.
Figure 2:
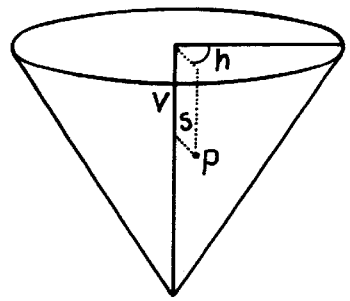
FIG. 2 shows the HSV color space.
Figure 3:
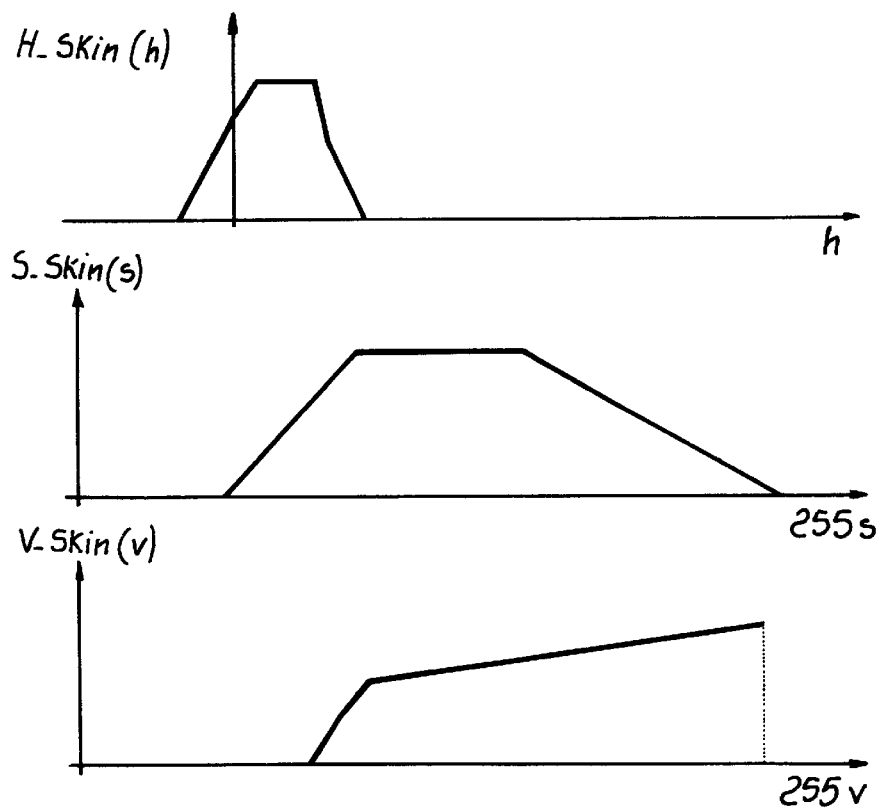
FIG. 3 shows three fuzzy sets for the skin color class according to the algorithm implemented with the device according to the present invention.

Three fuzzy sets, defined on H, S and V, are used to identify the skin color class. They are shown in FIG. 1.

The membership value to the skin color class of each pixel is computed by the aggregation of the membership value to the fuzzy sets on H, S and V. The rule used to identify the skin color class is the following:

IF $h_p$ is $H\_{Skinh}$ AND $s_p$ is $S\_{Skins}$ AND $v_p$ is $V\_{Skinv}$

THEN p has skin color

The first step of the algorithm consists in examining the image to determine if it is a "facial tone image", and consecutively find the corrections it would need.

To be considered "facial tone", an image is required to have a skin color class area wider than a fixed threshold. This threshold has been empirically found.

If this requirement is not met no further processing is carried on.

Otherwise the next step consists in a contextual evaluation of the membership value to the skin color class. This is performed by a mean operator. This step is necessary because it reduces some undesirable effects.

It is often desirable to process an image with fine grain textures, obtained by using pixels of different colors, which have the appearance of uniformly colored regions. When a single color class is processed the appearance of the texture could be altered because only some pixels of the textured region belong to the color class and only those pixels will be modified.

Figure 4:
FIG. 4 shows fuzzy sets for the evaluation of correction parameters, according to the algorithm implemented with the device of the present invention.
Figure 4:
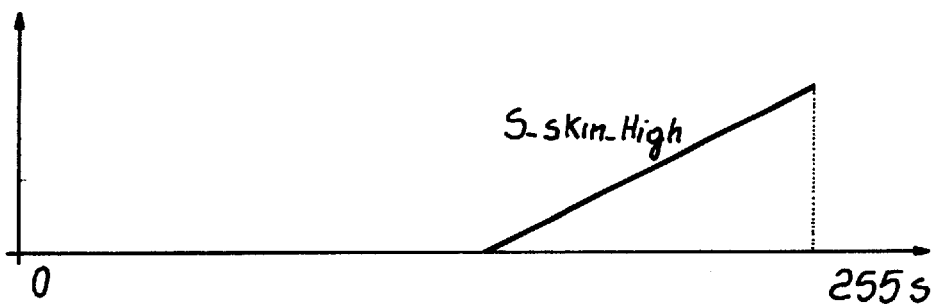
Figure 4:
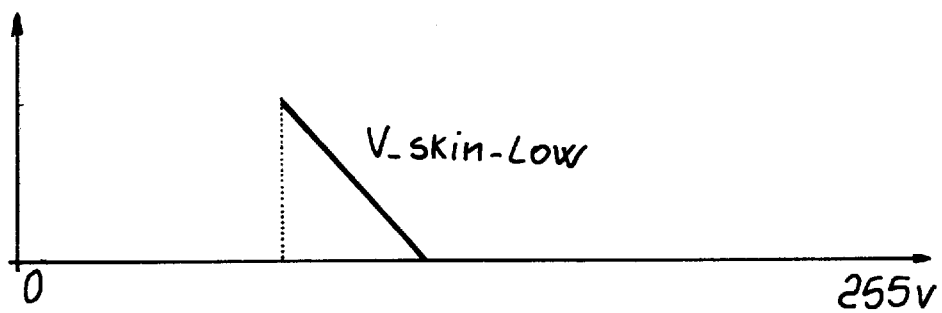
Figure 4:
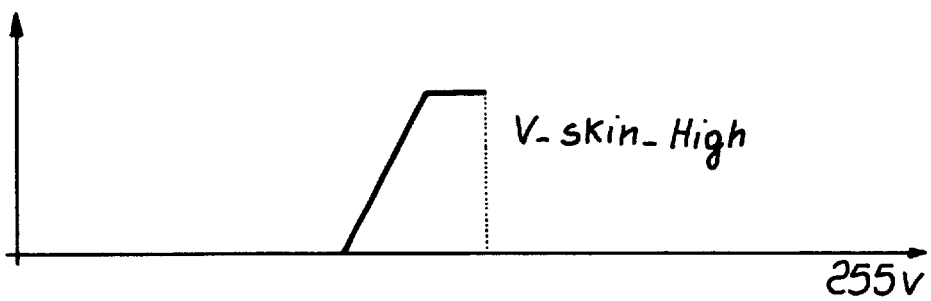

First a mean operator is applied on the image and the membership values of each pixels are calculated. To identify the parameters of the corrections some other membership functions are used. These functions, as shown in FIG. 4, relate to different levels of saturation and value (low, medium and high). Once we have the membership value of each pixel for these fuzzy sets, it is possible to obtain some indexes concerning the degree of and value inside the skin color class.

In this way the region corresponding to the skin color class has been divided in fuzzy subregions. For each subregion the mean saturation and the mean value are calculated.

Two other values are considered: the prototypes of skin saturation and skin value. These have been chosen empirically, after having examined several images. With the use of all these quantities the parameters for the corrections are computed.

In this way the corrections are automatically calculated on the basis of the current image. The formula that computes the correction for the saturation is different from the one that computes the correction for the value. The reason for this is based on the different sensitivity of the eye to variations in saturation and variations in value.

Now, a description will be given of an embodiment of the present invention by referring to FIG. 5 and FIG. 6.

Figure 5:
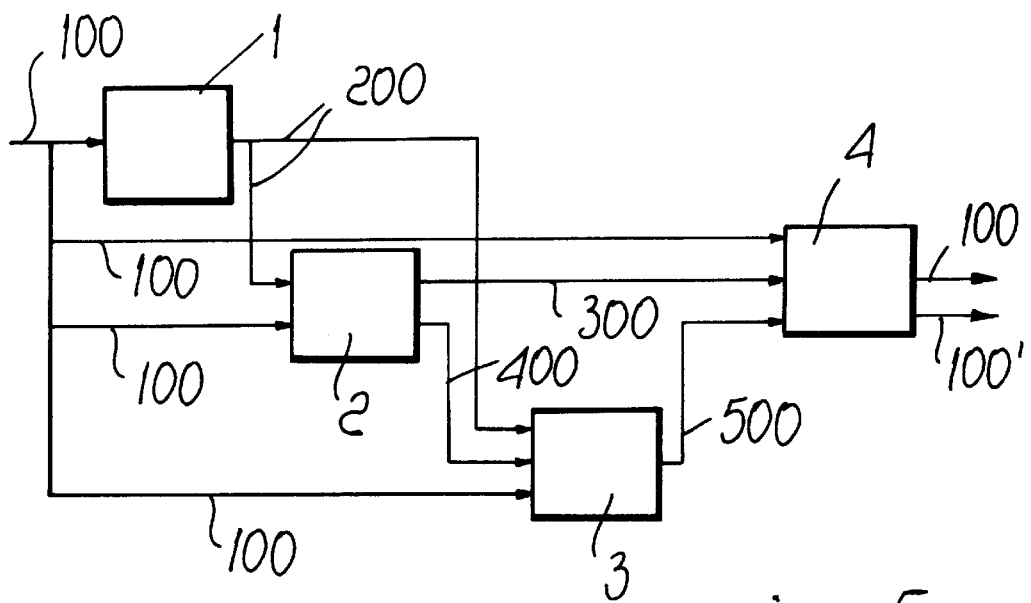
FIG. 5 is a block diagram showing the image processing device of the present invention.

FIG. 5 represents an image processing apparatus of the present invention which generally has an input device (not shown), a pixel fuzzifier unit 1, a global parameters estimator 2, a processing unit 3, a processing switch 4 and an output unit (not shown).

The input device is assumed to produce a stream of pixels 100 belonging to a sequence of highly correlated frames, such a s digital TV signal or an MPEG stream. The pixel fuzzifier 1 takes a multilevel bit pixel in input and, after a contextualization step, computes a multilevel value 200 representing a membership of the pixel to skin color class.

The global parameter estimator 2 takes in input the original pixel 100 and its membership value 200 and, after a whole field has been examined, it computes two global quantities 300, 400 to be used in the following processing steps during the computation of the next field. The processing unit 3 makes use of the pixel 100, its membership value 200 and one of the global parameters, 400, to accomplish the desired color correction.

The processing switch 4 outputs the original pixel 100 or the corrected one 100' on the basis of the other global parameter, 300. The output unit is assumed to be a suitable device for further processing or image visualization/storage.

Figure 6:
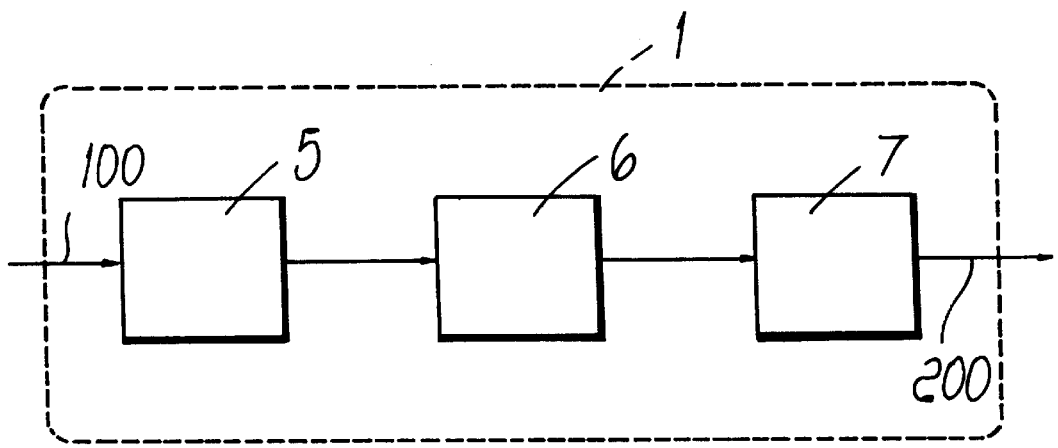
FIG. 6 is a diagram showing the construction of the pixel fuzzifier unit of the image processing device shown in FIG. 5.

FIG. 6 shows the construction of the pixel fuzzifier. This unit includes a contextual processing unit 5, a conversion unit 6 and a membership function evaluation unit 7.

The conversion unit 6 applies a transformation from the original RGB color space to the HSV color space, more suitable for the identification of color classes. The membership function evaluation unit 7 computes the membership value of the pixel to the skin color class. The fuzzy set on the HSV space is defined by means of the aggregation of three fuzzy sets, defined on the H, S and V axes separately.

The contextual processing unit 5 has been introduced to reduce undesirable effects arising when processing textured regions. In fact fine textured region that are not noticeable in the original image may become manifest after the color correction.

The contextual processing consists of special filtering. Due to the properties of the RBG color space, this processing has been introduced before the color space conversion.

FIG. 7 shows the construction of the global parameters estimator 2. It consists of two parts. The first part, 8, estimates the area of the skin color class inside the image. The second part, 9, computes the coefficients for the correction.

Since the coefficients evaluated on a frame should be used for the processing of the same frame, a frame buffer should be introduced to delay the processing. But assuming a high correlation between contiguous frames, the coefficients related to a frame are computed using the information of the precedent frame.

In this way it is possible to avoid the frame buffer and the delay it should require. The area of the skin color class is evaluated on the basis of the percentage of pixels belonging to the class. There are two correction coefficients, one for the saturation and one for the value. They are computed making use of fuzzy inference.

The evaluation of each correction coefficient depends on some quantities, which represent the average membership values to the classes low, high and medium value and saturation, and the average saturation and value inside the above-mentioned classes. Ale @ rules used to evaluate the coefficients for the correction are constructed on the basis of these quantities.

An example of such a rule is the following:

IF skin color class IS high-saturated THEN decrement saturation

IF skin color class is low-valued THEN increment value.

The formulas used to increment or decrement the saturation and the value are quite different. The decision to use different formulas has been done on the basis of some considerations regarding the way the eye perceives variations in saturation in respect to variation in values.

FIG. 8 represents the construction of the processing unit 3. This consists of a conversion unit 6, a correction unit 11, a back-conversion unit 12 and a soft-switch unit 13. The conversion unit 6 is the same used in the pixel fuzzifier unit 1.

The correction unit 11 receives in input the pixel 100 and the coefficient 400 for the correction from the global parameter estimator 2 and performs the correction. The corrections consist of adding the coefficient 400, whose sign depends on considerations made on the basis of the fuzzy rules, to the original coordinate of the pixel 100. The following unit, 12, converts back the processed pixel to the RGB color space.

A weighted average is performed by the soft-switch unit 13, that receives in input the membership value 200 of the pixel to the skin color class, the original pixel 100 and the corrected one (i.e. the output from the back-conversion unit 12). The more the pixel belongs to the skin color class, the more the pixel is corrected. A pixel with membership value close to zero is not affected by the correction.

The output 500 of the soft-switch unit 13, is input to the processing switch unit 4, whose construction is shown in FIG. 9. This unit is constituted by a selector 14. This unit receives in input the original pixel 100, the corrected one 500 and the first global parameter 300 representing the area of the skin color class.

If the skin color class has an area large enough, the processing switch unit 4 outputs the corrected pixel 100' otherwise it outputs the original pixel 100. The output unit is assumed to be a suitable device for further processing or image visualization or storage.

It has thus been shown that the described invention achieves the intended aim and objects.

In fact, only the portion of the digital video image which represents a facial tone image is processed in order to bring the colors of this portion as close as possible to the real colors that the human eye can perceive during everyday life.

Thus the processing and the consequent correction of the concerned pixels is applied only if the image is identified as "facial tone image". If the input image is not a "facial tone image" no processing will be carried out. The corrections are determined and applied in the HSV color space. The transformation to HSV color space is necessary because in this space the description of the color is much more intuitive than in the RGB color space, so the description of the skin color class is easier than in RBG space.

When in the above disclosure reference is made to "pixel" it is obviously meant that each pixel of the digital video image undergoes the above-explained processing.

The present invention thus conceived is susceptible of numerous modifications and variations, all of which are within the scope of the inventive concept.

All the details may also be replaced with other technically equivalent elements.

In the practical embodiment of the present invention, the materials used, as well as the shapes and the dimensions, may be any according to the requirements without thereby abandoning the scope of the protection of the claims that follow.

Where technical features mentioned in any claim are followed by reference signs, those reference signs have been included for the sole purpose of increasing the intelligibility of the claims and accordingly, such reference signs do not have any limiting effect on the scope of each element identified by way of example by such reference signs.

We claim:

1. A digital image color correction device for correcting a facial tone image portion of a digital video image, the device comprising:
    a pixel fuzzifier unit receiving in input a stream of pixels belonging to a sequence of correlated frames of a digital video image and computing a multilevel value representing a membership of each pixel to a skin color class;
    a global parameter estimator receiving in input each of said pixels and the relative membership value, and computing a first and second parameter which define the characteristics of pixels in a portion of said image that belongs to said skin color class;
    a processing unit connected downstream to said global parameter estimator and to said pixel fuzzifier unit and adapted to correct each of the pixels of said portion of the image that belongs to said skin color class, according to said first global parameter, to obtain corrected pixels, so that each pixel of said portion is corrected based upon other pixels in said portion; and
    a processing switch for outputting said pixels or said corrected pixels according to said second global parameter.

2. The device according to claim 1, wherein said pixel fuzzifier unit comprises:
    a contextual processing unit adapted to perform a spatial filtering on the pixels input to said pixel fuzzifier unit;
    a conversion unit connected downstream to said contextual processing unit and adapted to perform a transformation of each pixel from a RGB color space to a HSV color space; and
    a membership function evaluation unit connected to the output of said conversion unit and adapted to compute the membership value of each of said pixel with respect to said skin color class.

3. The device according to claim 1, wherein said global parameter estimator comprises:
    an area estimation unit receiving in input said pixels and determining the areas of said skin color class inside said digital image; and
    a coefficient estimation unit receiving in input the membership value of each of said pixels and adapted to compute, by means of fuzzy logic inference, correction coefficients for said pixels which belong to said skin color class.

4. The device according to claim 2, wherein said processing unit receives in input said pixels, said first global parameter, and the memberships of each of said pixels.

5. The device according to claim 4, wherein said processing unit comprises a conversion unit connected to a correction unit which is in turn connected to a back-conversion unit cascade connected to a soft-switch unit.

6. The device according to claim 5, wherein said conversion unit receives in input the pixels of the digital image and is the same as the conversion unit of the pixel fuzzifier unit.

7. The device according to claim 6, wherein said correction unit receives in unit the pixels color space-converted by said conversion unit and said second global parameter computed by the global parameter estimator and outputs corrected pixel which are then input to said back-conversion unit.

8. The device according to claim 7, wherein said soft-switch unit receives in input the output of said back-conversion unit, said pixels and the membership values for each of said pixels, said soft-switch unit performing a weighted average to output furtherly corrected pixels which are then input to said processing switch unit.

9. The device according to claim 8, wherein said processing switch unit comprises a selector which received in input said pixels, said first global parameter and the output of said soft-switch unit, to output said pixels or said furtherly corrected pixels.

10. A method for color correcting a facial tone image portion of a digital video image composed by a sequence of correlated frames, the method comprising the steps of:
    defining one or more fuzzy logic-defined sets to be used to identify a skin color class of a facial tone image portion of a digital video signal;
    examining the digital video image to determine if a portion thereof is a facial tone image;
    in case of positive response, dividing said facial tone image into spatial subregions and for each subregion calculating the mean saturation and the mean value thereof;
    carrying out a color correction of the pixels of the facial tone image portion, a color correction of each pixel of the facial tone image portion being based upon the mean saturation and mean value of the spatial subregion corresponding to the pixel; and
    outputting a corrected facial tone image portion.

11. The method according to claim 10, wherein the step of examining the image comprises applying fuzzy logic on the pixels belonging to the video signal image to determine the membership of each pixel to the skin color class.

12. The method according to claim 11, wherein said step of applying fuzzy logic comprises the steps of:
   spatially filtering the video digital signal;
   converting the pixel representation of the video digital signal from RGB color space representation to HSV color space representation; and
   determining membership value of each pixel of the image to the skin color class.

13. The method according to claim 10, wherein said step of carrying out a color correction includes the step of computing parameters for correction of the pixels belonging to said facial tone image portion, by means of said mean saturation and mean value and further by means of prototypes of skin saturation and skin value.

14. The method according to claim 13, wherein the step of computing parameters for correction of the pixels belonging to said facial tone image portion comprises the steps of:
   estimating the area of the skin color class inside the facial tone image portion; and
   computing, by means of fuzzy inference, coefficients for the correction of the pixel of the facial tone image portion.

15. The method according to claim 14, wherein the area of the skin color class is evaluated on the basis of the percentage of pixels belonging to the class.

16. The method according to claim 14, wherein the coefficients for correction are computed by using fuzzy logic inference.

17. The method according to claim 14, wherein the step of correcting the pixels of said facial tone image portion comprises the steps of:
   adding the coefficients to the coordinates of pixels of the facial tone image portion, the sign of said coefficients depending from predetermined fuzzy logic rules; and
   back-converting the corrected pixels from HSV color space representation in RGB color space representation.

18. The method according to claim 17, wherein the step of correcting the pixels of the facial tone image portion further comprises the steps of:
   making, for each pixel of the facial tone image portion, a weighted average of the pixel, of the corrected pixel and of the membership value to the skin class.

19. The method according to claim 18, further comprising the steps of:
   determining if the skin color class has an area larger than a predetermined threshold;
   in case of positive response, outputting the corrected pixels; and
   in case of negative response, outputting the pixels without any correction.

20. The method of claim 10, wherein each spatial subregion is defined using fuzzy logic.

21. An apparatus for correcting a digital color image, comprising:
   a first unit for determining whether a portion of the digital color image includes a predetermined tone;
   a second unit for selectively dividing the predetermined tone image portion into spatial subregions;
   a third unit for calculating the mean saturation and the mean value for each spatial subregion;
   a fourth unit for determining a color correction of the pixels of the predetermined tone image portion, a color correction of each pixel of the predetermined tone image portion being based upon the mean saturation and mean value of the spatial subregion corresponding to the pixel; and
   a fifth unit for selectively incorporating the color correction of the predetermined tone image portion into the digital color image.

22. The apparatus according to claim 21, wherein the first unit operates to perform fuzzy logic on the pixels belonging to the video signal image to determine the membership of each pixel to the class of the predetermined tone.

23. The method according to claim 21, wherein the second unit operates to compute parameters for correction of the pixels belonging to said predetermined tone image portion, based upon said mean saturation, said mean value and predetermined prototypes of predetermined saturation and value.

24. The apparatus according to claim 21, wherein the second unit operates to:
   spatially filter the video digital signal;
   convert the pixel representation of the video digital signal from RGB color space representation to HSV color space representation; and
   determine membership value of each pixel of the image to the class of the predetermined tone.

25. The apparatus according to claim 21, wherein the second fourth unit operates to:
   estimate the area of the class of the predetermined tone inside the image; and
   compute, by means of fuzzy inference, coefficients for the correction of the pixel of the predetermined tone image portion.

26. The apparatus according to claim 21, wherein the area of the class of the predetermined tone is evaluated on the basis of the percentage of pixels belonging to the class.

27. The apparatus according to claim 21, wherein:
   the second unit operates to determine if the class of the predetermined tone has an area larger than a predetermined threshold; and
   the fifth unit outputs the corrected pixels in case of positive response, and outputs uncorrected pixels in case of negative response.

28. The apparatus of claim 21, wherein:
   the second unit divides the predetermined tone image portion into a plurality of fuzzy logic subregions.

29. The apparatus of claim 21, wherein:
   the second unit divides the predetermined tone image portion into a plurality of subregions using fuzzy logic.

* * * * *

UNITED STATES PATENT AND TRADEMARK OFFICE
CERTIFICATE OF CORRECTION

PATENT NO.    : 6,272,239 B1
DATED         : August 14, 2001
INVENTOR(S)   : Colla et al.

It is certified that error appears in the above-identified patent and that said Letters Patent is hereby corrected as shown below:

Column 2,
Line 14, replace "THEN $_p$ is blue" with -- THEN p is blue --

Column 6,
Line 11, replace "The contextual processing consists of special filtering." with
-- The contextual processing consists of spacial filtering. --

Signed and Sealed this

Eleventh Day of March, 2003

JAMES E. ROGAN
*Director of the United States Patent and Trademark Office*